US008352507B2

(12) United States Patent
Patch et al.

(10) Patent No.: US 8,352,507 B2
(45) Date of Patent: Jan. 8, 2013

(54) RETRIEVAL AND STORAGE OF LOCALIZED INSTANCES OF DATA OBJECTS

(75) Inventors: Raymond R. Patch, Redmond, WA (US); Rajeev S. Chauhan, Issaquah, WA (US); Daniel K. Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 12/915,044

(22) Filed: Oct. 29, 2010

(65) Prior Publication Data

US 2012/0109998 A1    May 3, 2012

(51) Int. Cl.
*G06F 17/30* (2006.01)
(52) U.S. Cl. .................................. 707/802; 707/806
(58) Field of Classification Search .................. None
See application file for complete search history.

(56) References Cited

U.S. PATENT DOCUMENTS

| 7,747,588 B2 | 6/2010 | Thompson et al. | |
| 2008/0189240 A1 | 8/2008 | Mullins et al. | |
| 2009/0222480 A1* | 9/2009 | Copeland et al. | 707/103 R |
| 2010/0185652 A1 | 7/2010 | Bak et al. | |

OTHER PUBLICATIONS

"Oracle Globalization Development Kit", Retrieved at << http://download.oracle.com/docs/cd/B13789_01/server.101/b10749/ch8gdk.htm >>, Aug. 2, 2010, pp. 48.

"Windows Management Instrumentation: International Support Overview", Retrieved at << http://technet.microsoft.com/en-us/library/bb742611.aspx >>, Aug. 2, 2010, pp. 11.

"Multilingual internationalization services", Retrieved at << http://docs.python.org/library/gettext.html >>. pp. 18, (Oct. 25, 2010).

"Localization", Retrieved at << http://www.spicefactory.org/parsley/docs/1.0/manual/localization.php >>, Aug. 2, 2010, pp. 5.

"Globalization and Localization Support", Retrieved at << http://etutorials.org/Programming/building+solutions+with+the+microsoft+net+compact+framework/Part+III+Additional+Programming+Considerations/Chapter+8.+Localization/Globalization+and+Localization+Support/ >>, Aug. 2, 2008, pp. 8.

Siracusa, John, "Rose::HTML::Objects—Object-oriented interfaces for HTML", Retrieved at << http://search.cpan.org/~jsiracusa/Rose-HTML-Objects-0.607/lib/Rose/HTML/Objects.pm >>, Aug. 2, 2010, pp. 14.

Hagen, Eric, "Adding Locales to Documentum WDK-Based Applications," documentum, dated Jun. 21, 2004, 21 pages.

* cited by examiner

*Primary Examiner* — Hung Q Pham
(74) *Attorney, Agent, or Firm* — Toler Law Group, PC

(57) ABSTRACT

A method includes receiving, at a first computing device, a request to retrieve a localized instance of a data object. The request is received from a second computing device and includes an object name. A locale applicable to the request is identified, and the localized instance of the data object is retrieved based on the object name and the identified locale. The localized instance includes a plurality of data elements specific to the identified locale. The method includes transmitting the localized instance to the second computing device.

14 Claims, 9 Drawing Sheets

```
Class Product {
    string  Name;
    string  Description;
    int     AvailableQuantity;
    float   PriceAmount;
    string  PriceCurrency;
}
```
302

300

"DESKTOP MONITOR" MULTI-DIMENSIONAL DATA OBJECT

310
"en-US" LOCALIZED INSTANCE

Name = "Monitor"
Description = "High Resolution"
AvailableQuantity = 25
PriceAmount = 175.00
PriceCurrency = "U.S. Dollars"

320
"fr-FR" LOCALIZED INSTANCE

Name = "Moniteur"
Description = "Haute Résolution"
AvailableQuantity = 25
PriceAmount = 126.75
PriceCurrency = "Euro"

330
"pt-BR" LOCALIZED INSTANCE

Name = "Monitor"
Description = "Alta Resolução"
AvailableQuantity = 25
PriceAmount = 295.05
PriceCurrency = "Brazilian Reais"

*FIG. 3*

```
//Connect to Object Namespace Service
501 { ObjectNamespace objectNamespace = ObjectNamespace.Connect();

//Create instances
      Address enUSaddress =
            new Address("Redmond","98052","WA","One Microsoft Way");
502 { Address frCAaddress =
            new Address("Mississauga","L5N 8L9","Ontario","1950 Meadowvale
                        Blvd.");

//Store and Retrieve en-US instance without specifying locale (i.e., default locale used)
      objectNamespace.Write("ADDRESS", WriteOptions.None, enUSaddress);

503 { Address readAddress = (Address)objectNamespace.ReadObject(
            "ADDRESS",
            ReadOptions.None);

//Store and Retrieve fr-CA instance by specifying locale
      WriteInfo writeInfo = newWriteinfo(WriteOptions.None, new CultureInfo("fr-CA"));
      objectNamespace.Write("ADDRESS", writeInfo, frCAaddress);

504 { ReadInfo readInfo = new ReadInfo(ReadOptions.None, new CultureInfo("fr-CA"));
      Address readLocalizedAddress = (Address)objectNamespace.ReadObject(
            "ADDRESS",
            readInfo);

//Retrieve fr-CA instance while providing a prioritized list of fallback locales
      ReadInfo readInfo2 = new ReadInfo(
            ReadOptions.None,
            new CultureInfo("en-GB"),
            new CultureInfo("en-CA"),
505 {       new CultureInfo("en-US"));
      Address readLocalizedAddress2 = (Address)objectNamespace.ReadObject(
            "ADDRESS",
            readInfo);
```

*FIG. 5*

RETRIEVAL AND STORAGE OF LOCALIZED INSTANCES OF DATA OBJECTS

BACKGROUND

The object-oriented programming paradigm is popular in enterprise applications. Under the object-oriented programming paradigm, software developers define software in terms of classes and objects. In certain situations, a software developer may develop an application as a globalized application. Certain types of objects in globalized applications may be represented in accordance with globalization techniques. For example, string variables may be represented in a Unicode format. As the number of locations in which a particular application may be used increases (e.g., an application that is used in many different countries with different languages), the complexity involved in the task of managing data of a globalized application increases.

SUMMARY

Developers of enterprise business applications may face three obstacles: storing data to and retrieving data from databases, mapping data between application objects that are stored in memory and database procedure calls, and managing localized data instances. For example, in .NET applications, a resource file (e.g., a RESX file) may store localized data in <key, value> pairs, where the key (e.g., "EnglishDisclaimer") is an arbitrary value used to retrieve localized data (e.g., "Not responsible for lost items.") stored as the value. From a developer's perspective, this process of retrieving localized data may be decoupled from the object (e.g., "ShippingContract") that is used to build the application. In addition, when a data element changes, the software developer redeploys localized objects to reflect the change.

Systems and methods of retrieving and storing localized instances of data objects are disclosed. The disclosed techniques enable storage of localized data along with object data and enable retrieval of localized data based on a locale-agnostic object name. Thus, software developers may retrieve and store localized data without requiring knowledge of <key, value> resource mappings or database storage implementation details. To retrieve a localized instance of a data object (e.g., a data object populated with locale-specific data), an application may transmit a request that includes the name of the data object to an object namespace service. The request may optionally include a desired locale and one or more fallback locales. The service may retrieve the appropriate localized instance of the data object based on the name of the data object and the desired locale and may transmit the localized instance to the application. Alternately, when a localized instance is not available, the service may transmit an instance of the data object that is specific to one of the fallback locales.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 is a diagram to illustrate another particular embodiment of a multi-dimensional data object;

FIG. 5 is a diagram to illustrate a particular embodiment of code executable by the system of FIG. 1 to store and retrieve localized instances of data objects;

DETAILED DESCRIPTION

In a particular embodiment, a method includes, at a first computing device, receiving a request from a second computing device to retrieve a localized instance of the data object. The request includes an object name. The method also includes identifying a locale applicable to the request and retrieving the localized instance of the data object based on the object name and the identified locale. The localized instance includes a plurality of data elements specific to the identified locale. The method further includes transmitting the localized instance to the second computing device.

In another particular embodiment, a computer system includes a processor and one or more data storage devices to store an object database. The system also includes a communication interface that is configured to receive, from a computing device, a request to retrieve a localized instance of a data object from the object database. The request includes an object name, a requested locale, and one or more fallback locales. The communication interface is also configured to transmit the localized instance of the data object to the computing device. The system further includes a retrieval module that is executable by the processor to determine whether an instance of the data object that is specific to the requested locale is available. When the instance is available, the retrieval module is executable to retrieve first localized data of the data object from the object database based on the object name and the requested locale and to create the localized instance of the data object based on the first localized data. When the instance is not available, the retrieval module is executable to retrieve second localized data of the data object from the object database based on the object name and one of the fallback locales and to create the localized instance of the data object based on the second localized data.

In another particular embodiment, a non-transitory computer-readable storage medium includes instructions that, when executed by the computer, cause the computer to receive a request to store a localized instance of a data object to a database. The request includes an object name and a locale. The localized instance includes one or more data elements specific to the locale and metadata that identifies the locale. The instructions are also executable to store the localized instance at the database such that the localized instance is retrievable from the database via a key that is based on a combination of the object name and the target locale. The instructions are further executable to receive a second request to retrieve the localized instance of the data object from the database, where the second request includes the object name and the locale. The instructions are executable to retrieve the localized instance of the data object from the database based on the combination of the object name and the locale.

Figure 1:
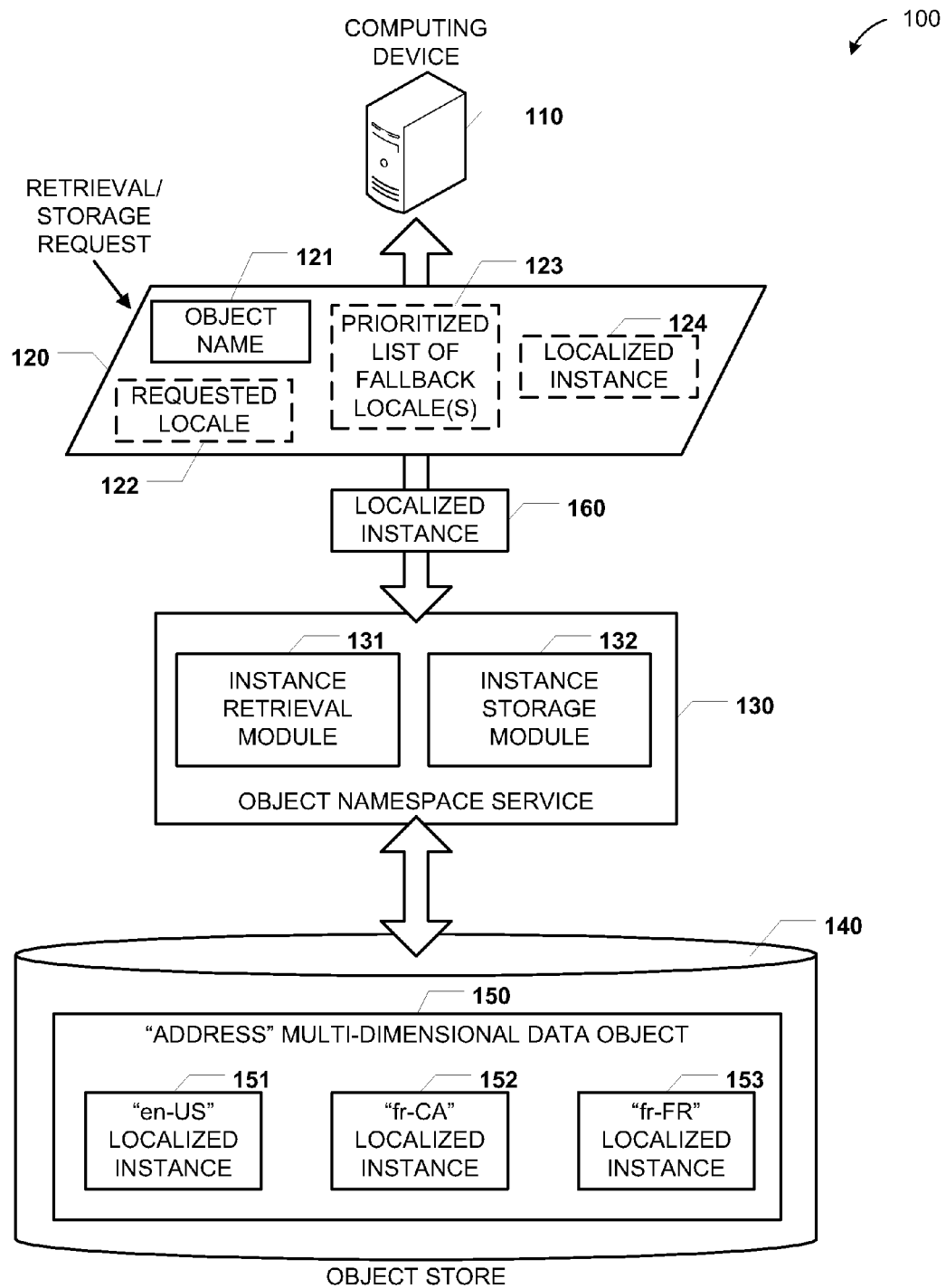
FIG. 1 is a diagram to illustrate a particular embodiment of a system to store and retrieve localized instances of data objects.

FIG. 1 is a diagram to illustrate a particular embodiment of a system 100 to store and retrieve localized instances of data objects. The system 100 includes an object namespace service 130 communicatively coupled to one or more computing devices (e.g., an illustrative computing device 110) and to an object store 140. Generally, the system 100 may enable the object namespace service 130 to store and retrieve localized instances of data objects from the object store 140.

The computing device 110 may be a desktop computer, a laptop computer, a netbook computer, a mobile computing device, a wireless telephone, or some other computing device. In an illustrative embodiment, the computing device 110 executes an application that uses localized data. For example, the computing device 110 may execute a browser that renders a website that can display localized data specific to a plurality of locales. Depending on what locale (e.g., country or language) the browser is operating in, the browser may retrieve and present different localized data.

To access localized data, the computing device 110 may transmit a request 120 to the object namespace service 130. The request 120 may be a request to retrieve a localized instance of a data object or a request to store a localized instance of a data object. The request 120 may include an object name 121 of the requested data object. When the request 120 is a retrieval request, the request 120 may also include a requested locale 122 and a prioritized list of one or more fallback locales 123. Fallback locales may be prioritized when certain fallback locales are more desirable than other fallback locales. For example, when data specific to a "Monaco" locale is unavailable, data specific to a "France" locale may be more desirable than data specific to a "Romania" locale, due to linguistic similarities and geographic proximity between Monaco and France. When the request 120 is a storage request, the request 120 may include a requested locale 122 and a localized instance 124 to be stored, in addition to the object name 121.

The object namespace service 130 may be an Internet-accessible, cloud-accessible, or local network-accessible web service that facilitates retrieval and storage of localized data. The object namespace service 130 may include an instance retrieval module 131 and an instance storage module 132. When the request 120 is a retrieval request, the instance retrieval module 131 may attempt to retrieve a localized instance 160 of the data object from the object store 140 and may transmit the retrieved localized instance 160 to the computing device 110. When the request 120 is a storage request, the instance storage module 132 may store the localized instance 124 (included in the request 120) at the object store 140.

In a particular embodiment, the object store 140 is an object database stored at one or more data storage devices. The one or more data storage devices may be internal to a server that executes the object namespace service 130 or may be located remote to the object namespace service 130. In a particular embodiment, the object store 140 is a structured query language (SQL) database that stores localized instances of data objects at one or more database tables. A data object that has a plurality of localized instances for a plurality of locales may be considered a multi-dimensional data object (e.g., a unified .NET data object that includes a plurality of instances that vary with respect to a "locale" dimension). It should be noted that .NET is referenced for illustrative purposes only. Localized instances of multi-dimensional data objects associated with any computer language may be retrieved and stored as disclosed herein.

In the particular embodiment illustrated in FIG. 1, the object store 140 stores an "ADDRESS" multi-dimensional data object 150 that has three localized instances: an American English ("en-US") localized instance 151, a Canadian French ("fr-CA") localized instance 152, and a French French ("fr-FR") localized instance 153. Each localized instance 151-153 may contain data elements that are specific to a locale. The data elements may include strings, graphics, audio stream data, video stream data, and other types of data. To illustrate, the "en-US" localized instance 151 of the "ADDRESS" data object 150 may include an American contact address for a corporation, the "fr-CA" localized instance 152 may include a Canadian contact address for the corporation, and the "fr-FR" localized instance 153 may include a French contact address for the corporation. In a particular embodiment, each localized instance 151-153 includes metadata (e.g., object metadata) that identifies the locale that each localized instance 151-153 is specific to.

Localized data elements may be represented in accordance with a country (e.g., "Japan") of a particular locale, a language (e.g., "Japanese") of the particular locale, a character set (e.g., "Kanji") of the particular locale, a spelling rule (e.g., "colour" instead of "color") of the particular locale, a grammatical rule of the particular locale, a time format (e.g., 12-hour or 24-hour) of the particular locale, a date format (e.g., DD-MM-YYYY or MM-DD-YYYY) of the particular locale, a currency of the particular locale, a numeral system of the particular locale, a measurement unit system (e.g., metric system or imperial system) of the particular locale, or any combination thereof.

Each of the localized instances 151-153 may be accessible (e.g., for read or write operations) using a database key that is based on a combination of an object name and a locale. For example, the localized instances 151-153 may be accessible via the keys "ADDRESS en-US," "ADDRESS fr-CA," and "ADDRESS fr-FR," respectively. Thus, each localized instance 151-153 of the data object 150 may be associated with a common object name but may be specific to a different locale and may be uniquely identified via a combination of the common object name and the specific locale.

In a particular embodiment, the instance retrieval module 131 implements default locale and fallback locale functionality at the object store 140. For example, the request 120 may be a retrieval request that includes the object name 121 "ADDRESS" and the requested locale 122 "en-CA" (representing Canadian English). The instance retrieval module 131 may determine whether an "en-CA" localized instance of the "ADDRESS" data object is available at the object store 140. When the instance is not available, the instance retrieval module 131 may retrieve and transmit a localized instance that is particular to a default locale. For example, the "en-US" localized instance 151 may be transmitted to the computing device 110, where the "en-US" locale is a designated as a fallback locale. Alternately, the instance retrieval module 131 may use the fallback locales 123, if provided in the request 120, to identify a fallback locale. The instance retrieval module 131 may retrieve and transmit an instance that is specific to the identified fallback locale to the computing device 110.

During operation, the object namespace service 130 may receive the request 120 from the computing device 110. For example, the request 120 may be a request to retrieve a localized instance of the "ADDRESS" data object 150. The request 120 may include the object name 121 "ADDRESS." The instance retrieval module 131 may determine a locale that is applicable to the request 120. When the request 120 is transmitted by a browser at the computing device 110, the applicable locale may be a locale of the browser. Alternately, when the request 120 includes the requested locale 122, the requested locale 122 may be considered the applicable locale. For example, the request 120 may include the requested locale 122 "fr-CA." In this case, the instance retrieval module 131 may retrieve and transmit the "fr-CA" localized instance 152 to the computing device 110 as the localized instance 160. When a localized instance for the requested locale 122 is not available, the instance retrieval module 131 may identify a fallback locale. For example, the request 120 may include the prioritized list of one or more fallback locales 123. The instance retrieval module 131 may iterate through the one or more fallback locales 123 in decreasing order of priority until a fallback locale having a localized instance is identified.

Alternately, when the request 120 does not include the requested locale 122, the instance retrieval module 131 may choose a default locale as the applicable locale. For example, the "en-US" locale may be a designated default locale for the "ADDRESS" data object 150. The instance retrieval module 131 may retrieve and transmit the "en-US" localized instance 151 to the computing device 110 as the localized instance 160. Additional requests to store other localized instances of the "ADDRESS" data object 150 may similarly be serviced.

As another example, the request 120 may be a request to store the localized instance 124 of the data object. The request 120 may include the object name 121 and the requested locale 122. The requested locale 122 may be a target locale that the localized instance 124 is specific to. For example, the request 120 may be a storage request to store an Australian English localized instance 124 of the "ADDRESS" data object 150 to the object store 140. In this example, the request 120 may include the object name 121 "ADDRESS," the requested locale 122 "en-AU," and the Australian English localized instance 124. The instance storage module 132 may store the Australian English localized instance 124 at the object store 140, such that the Australian English localized instance 124 may be accessible via a database key, such as "ADDRESS en-AU."

It will be appreciated that the system 100 of FIG. 1 may enable the computing device 110 to store and retrieve localized data via the object namespace service 130 without providing resource mapping information or database commands. For example, the computing device 110 may store and retrieve various localized data sets for an object using only a name of the object and a locale identifier. It will be appreciated that since object names and locale identifiers may be more readily known by software developers than resource mappings or database commands, the system 100 of FIG. 1 may provide intuitive management of localized data. It will further be appreciated that the system 100 of FIG. 1 may provide centralized management of localized data for a plurality of computing devices. For example, computing devices other than the computing device 110 may store and retrieve localized data using the object namespace service 130, and may rely on the object namespace service 130 to provide the "current" localized instance when a localized instance is requested for a particular locale. When a data element in a localized instance changes (e.g., the data element is persisted at the object store 140), the object namespace service 130 may automatically propagate the change to clients in response to subsequent retrievals or via a "push" mechanism.

Figure 2:
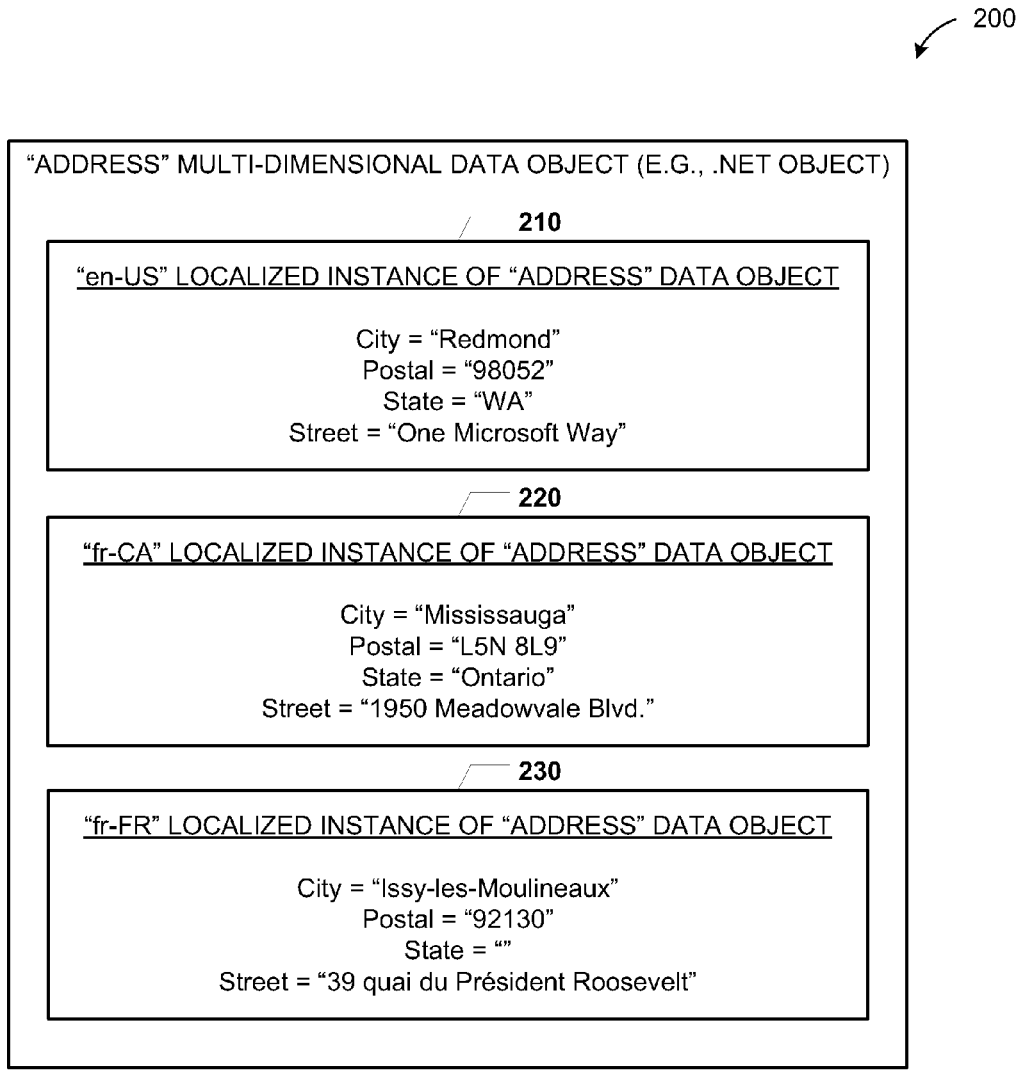
FIG. 2 is a diagram to illustrate a particular embodiment of the multi-dimensional data object of FIG. 1.

FIG. 2 is a diagram to illustrate a particular embodiment of a multi-dimensional data object 200. In an illustrative embodiment, the data object 200 is the data object 150 of FIG. 1. For example, the data object 200 may be a multi-dimensional .NET data object.

In the particular embodiment illustrated in FIG. 2, the data object 200 represents an "ADDRESS" class. The data object 200 may include a plurality of localized instances, each localized instance specific to a particular locale. For example, the data object 200 may include an "en-US" localized instance 210, an "fr-CA" localized instance 220, and an "fr-FR" localized instance 230. In an illustrative embodiment, the localized instance 210 is the localized instance 151 of FIG. 1, the localized instance 220 is the localized instance 152 of FIG. 1, and the localized instance 230 is the localized instance 153 of FIG. 1.

Each localized instance 210-230 may include a plurality of data elements that are specific to a particular locale. For example, the "ADDRESS" data object 200 may represent addresses of Microsoft Corporation, and each localized instance 210-230 may represent an address of a Microsoft Corp. office that is located in a particular country. To illustrate, the "en-US" localized instance 210 may include an American address for Microsoft Corp., the "fr-CA" localized instance 220 may include a Canadian address for Microsoft Corp., and the "fr-FR" localized instance 230 may include a French address for Microsoft Corp.

The localized instances 210-230 may enable applications to retrieve, store, and present localized data at run-time. For example, a web application may enable a user to enter into a contract with Microsoft Corp. Depending on the user's locale (e.g., as identified by the user's web browser), the appropriate address for Microsoft Corp. may be retrieved and used to populate the contract. Similarly, other multi-dimensional data objects associated with the contract may exist. For example, a "TERMS" object (not shown) may include differing contract terms in accordance with differing locale laws.

FIG. 3 illustrates an embodiment of a multi-dimensional data object 300 having associated localized data for multiple locales. In an illustrative embodiment, the data object 300 may be stored as described with reference to the data object 150 of FIG. 1.

In the particular embodiment illustrated in FIG. 3, the data object 300 represents an object of a "Product" class 302. The "Product" class 302 may include a plurality of data elements, such as a "Name," a "Description," an "AvailableQuantity" (e.g., number in inventory), and a retail price (e.g., represented by a "PriceAmount" and a "PriceCurrency"). To illustrate, an international shopping website may sell products to customers in various locales. Each product may be associated with an object of the "Product" class 302, and each such object may include one or more localized instances describing the product using locale-specific terms.

In FIG. 3, the data object 300 is associated with a "DESKTOP MONITOR" object of the "Product" class 302. For example, the data object 300 may represent a particular computer monitor sold by the shopping website. Each localized instance 310-330 of the data object 300 may include localized data for the "DESKTOP MONITOR" object. For example, the data object 300 may include an "en-US" localized instance 310, an "fr-FR" localized instance 320, and a "pt-BR" localized instance 330.

The data from the "en-US" localized instance 310 may be displayed to online shoppers that access a shopping website from the USA. The "en-US" localized instance 310 may include a name "Monitor," a description "High Resolution," an available quantity of 25, and a price of 175.00 U.S. Dollars. Data from the "fr-FR" localized instance 320 may be displayed to online shoppers that access the shopping website from France. The "fr-FR" localized instance 320 may include a name "Moniteur," a description "Haute Résolution," an available quantity of 25, and a price of 126.75 Euro. Data from the "pt-BR" localized instance 330 may be displayed to online shoppers that access a shopping website from the Brazil. The "pt-BR" localized instance 330 may include a name "Monitor," a description "Alta Resolução," an available quantity of 25, and a price of 295.05 Brazilian Reais. The available quantities in each of the localized instances 310-330 may be the same since the shopping website may have a shared inventory that is used to fulfill orders.

It will be appreciated that the data object 300 of FIG. 3 may include multiple localized representations of the same object (i.e., "DESKTOP MONITOR"). Based on a locale of an online shopper, language-specific and culture-specific information about available monitors for sale may be presented. When localized data for a particular locale is unavailable, the shopping website may use a "neutral" or "default" version of the "DESKTOP MONITOR" data object 300. It should be noted that although FIG. 3 depicts a product data object with localized instances, such illustration is for example only. Multi-dimensional objects and localized instances may be used for any type of data that can be localized.

Figure 4:
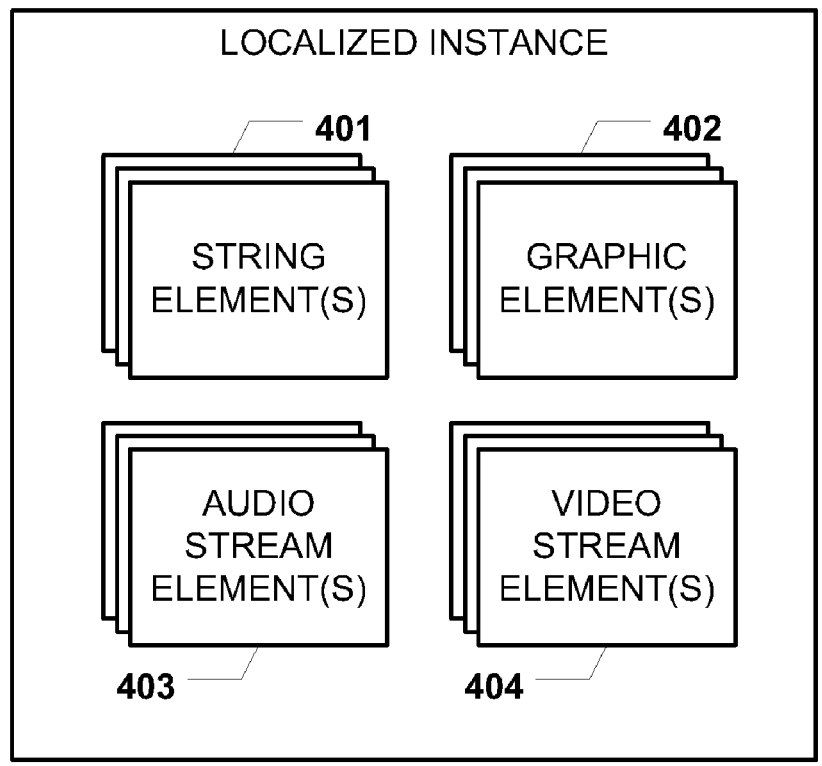
FIG. 4 is a diagram to illustrate a particular embodiment of one of the localized instances of FIG. 1.

FIG. 4 is a diagram to illustrate a particular embodiment of a localized instance 400. In an illustrative embodiment, the localized instance 400 is one of the localized instances 151-153 of FIG. 1 or one of the localized instances 210-230 of FIG. 2.

The localized instance 400 may be specific to a particular locale and may include a plurality of data elements that are specific to the particular locale. For example, the localized instance 400 may include one or more string elements 401 that are specific to the particular locale. Each of the string elements 401 may include text that is represented in accordance with one or more of language, spelling, grammar, or formatting conventions of the particular locale.

The localized instance 400 may also include one or more graphic elements 402. Each of the graphic elements 402 may include 2-D or 3-D images that are represented in accordance with visual information conventions of the particular locale. For example, the color red may have positive connotations in one locale but may have negative connotations in another locale. Thus, the graphic elements 402 in the localized instances for the two locales may differ with respect to use of the color red. As another example, different locales may use different signs or icons to designate browser operations such as "forward," "back," "stop," and "refresh." As a result, the graphic elements 402 in the localized instances for the two locales may differ with respect to the signs and icons that are included, so that a web application may provide familiar icons to users in each locale.

The localized instance 400 may also include one or more audio stream elements 403 and one or more video stream elements 404. In particular embodiments, some of the audio stream elements 403 and the video stream elements 404 may be combined (e.g., representing multimedia that includes both audio content as well as video content). Each of the audio stream elements 403 and the video stream elements 404 may include media that conforms to locale-specific multimedia guidelines. For example, for each particular locale, the audio stream elements 403 and the video stream elements 404 may include music or spokespersons that are well-recognized in that particular locale.

FIG. 5 is a diagram to illustrate a particular embodiment of code 400 that is executable to store and retrieve localized instances of data objects. In an illustrative embodiment, the code 400 is executable at the system 100 of FIG. 1. It should be noted that although the code 400 is designated as "executable" for illustrative purposes, the code 400 may not be directly executed in certain embodiments. Instead, the code 400 may be provided by a software developer and may be compiled and linked to generate an executable file. When executed, the executed file may perform functionality specified by the code 400.

The code 400 illustrated in FIG. 5 provides examples of various .NET code portions 501-505 that may enable storage and retrieval of localized instances of data objects as described herein. It should be noted that .NET is used for illustrative purposes only. Similar code may be defined in other computer programming languages. Moreover, in a particular embodiment, code defined in any language may be used to store and retrieve localized instances of data objects defined in any other language or in a language-independent format.

A first code portion 501 illustrates an embodiment of accessing an object namespace service. For example, the first code portion 501 may enable the computing device 110 of FIG. 1 to establish a connection (e.g., communication session) with the object namespace service 130 of FIG. 1. A second code portion 502 illustrates an embodiment of creating localized instances of data objects. For example, the second code portion 502 may enable the computing device 110 of FIG. 1 to create (e.g., in-memory at the computing device 110) the "en-US" localized instance 151 and the "fr-CA" localized instance 152.

A third code portion 503 illustrates an embodiment of storing and retrieving a localized instance without specifying a requested locale. For example, when no requested locale is specified, a default locale may be used as a fallback locale. To illustrate, a "Write" command of the third code portion 503 may be executable to cause the instance storage module 132 of FIG. 1 to store the "en-US" localized instance 151, under the object name "ADDRESS," to the object store 140. A "ReadObject" command of the third portion 503 may be executable to cause the instance retrieval module 131 of FIG. 1 to retrieve a default localized instance of the object named "ADDRESS" from the object store 140. In this case, a default localized instance may be retrieved, as the "ReadObject" command does not specify a requested locale.

A fourth code portion 504 illustrates an embodiment of storing and retrieving a localized instance by specifying a requested locale. For example, a "Write" command of the fourth code portion 504 may be executable to cause the instance storage module 132 of FIG. 1 to store the "fr-CA" localized instance 152, under the object name "ADDRESS," to the object store 140. A "ReadObject" command of the fourth code portion 504 may be executable to cause the instance retrieval module 131 of FIG. 1 to retrieve the "fr-CA" localized instance 152 from the object store 140.

A fifth code portion 505 illustrates an embodiment of retrieving a localized instance while providing a prioritized list of fallback locales. In the particular embodiment illustrated in FIG. 5, the requested locale is "en-GB" and the fallback locales are "en-CA" and "en-US," where "en-CA" has a higher fallback priority than "en-US." When a localized instance for the requested locale is not available, an instance that is specific to one of the fallback locales may be retrieved. To illustrate, a "ReadObject" command of the fifth code portion 505 may be executable to cause the instance retrieval module 131 of FIG. 1 to determine whether an instance that is specific to the requested "en-GB" locale is available at the object store 140 for the object name "ADDRESS." When no such instance is available, the instance retrieval module 131 may use the fallback locales in decreasing order of priority.

The instance retrieval module 131 may determine that an instance does not exist for the "en-CA" locale, and may then determine that the "en-US" localized instance 151 for the "en-US" locale is available. As a result, the instance retrieval module 131 may retrieve the "en-US" localized instance 151.

It will be appreciated that the code 400 illustrated in FIG. 5 may enable convenient and intuitive manipulation of localized data. For example, the storage and retrieval commands in the code 400 can be executed using an object name and a locale, which may be known to a software developer, and without knowledge of specific resource mappings that may require additional effort for a software developer to identify and maintain. It will also be appreciated that by providing default and fallback locale functionality, the code 400 may handle situations in which a requested localized instance is unavailable and situations in which a requested locale is not provided.

Figure 6:
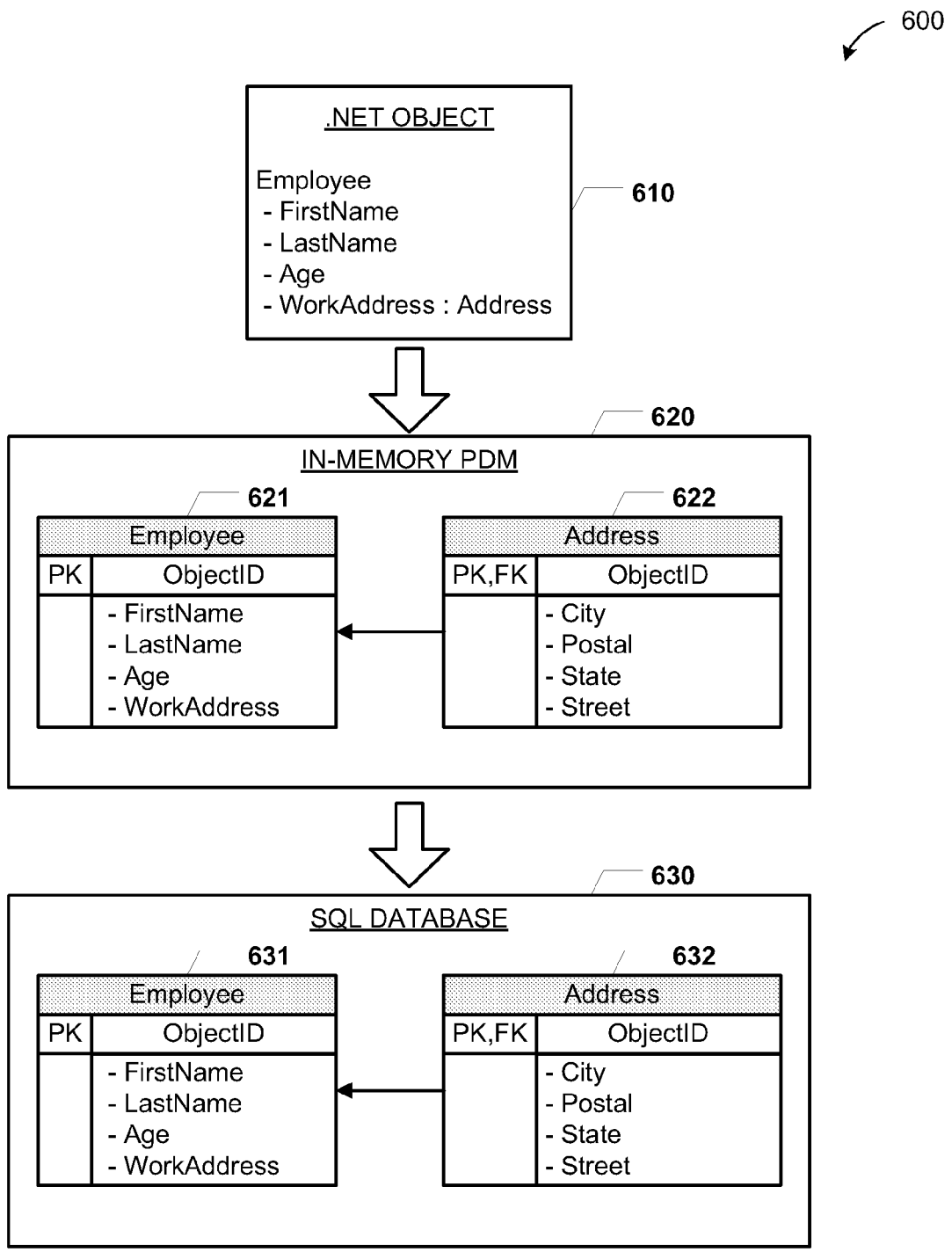
FIG. 6 is a diagram to illustrate a particular embodiment of data transformations performed during storage of a data object to an object store.

As the number of data objects and overall volume of data used by an application increases, it may become desirable to decouple application code from the data. For example, the data may be stored at an external database. When data objects are stored in a database, such as the object store 140 of FIG. 1, the data objects may be stored in the database using a different format than the format used by the application code. Thus, storing and retrieving a localized instance of a data object may include transformations between a database format and an application format. FIG. 6 illustrates a particular embodiment of data transformations 500 that may be performed when storing a localized instance of a data object to an object store. For example, the data transformations 500 may be performed by or caused by the instance storage module 132 of FIG. 1.

To illustrate, a request may be received to store a localized instance represented by a .NET object 610. The .NET object 610 may be a localized instance of an "Employee" class and may include a "FirstName" data element, a "LastName" data element, an "Age" data element, and a "WorkAddress" data element. The "WorkAddress" data element may be an object of an "Address" class. In a particular embodiment, metadata of the .NET object 610 identifies the locale the .NET object 610 is specific to.

During storage of the localized instance, the .NET object 610 may be used to populate an in-memory representation 620 of the .NET object 610. In a particular embodiment, the in-memory representation 620 is a physical data model (PDM) that is populated based on a database schema (e.g., an SQL schema) that is associated with the .NET object 610. For example, the PDM may be populated by a data access component (DAC). The in-memory representation 620 may include an in-memory representation 621 of the "Employee" object that is accessible via a primary key (PK) and an in-memory representation 622 of the "Address" object that is linked to the "Employee" object by a foreign key (FK).

The in-memory representation 620 may be written to the database, as illustrated by the database record 630. The database record 630 may include an "Employee" record 631 accessible via the PK and an "Address" record 632 that is linked to the "Employee" record by the FK.

When a request to retrieve a localized instance of a data object corresponding to the database record 630 is received, the data transformations 500 may be performed in reverse. For example, localized data of the data object may be retrieved from the database record 630. The applicable SQL schema may be identified and used to populate the in-memory representation 620, and the .NET object 610 may be created based on the in-memory representation 620.

Figure 7:
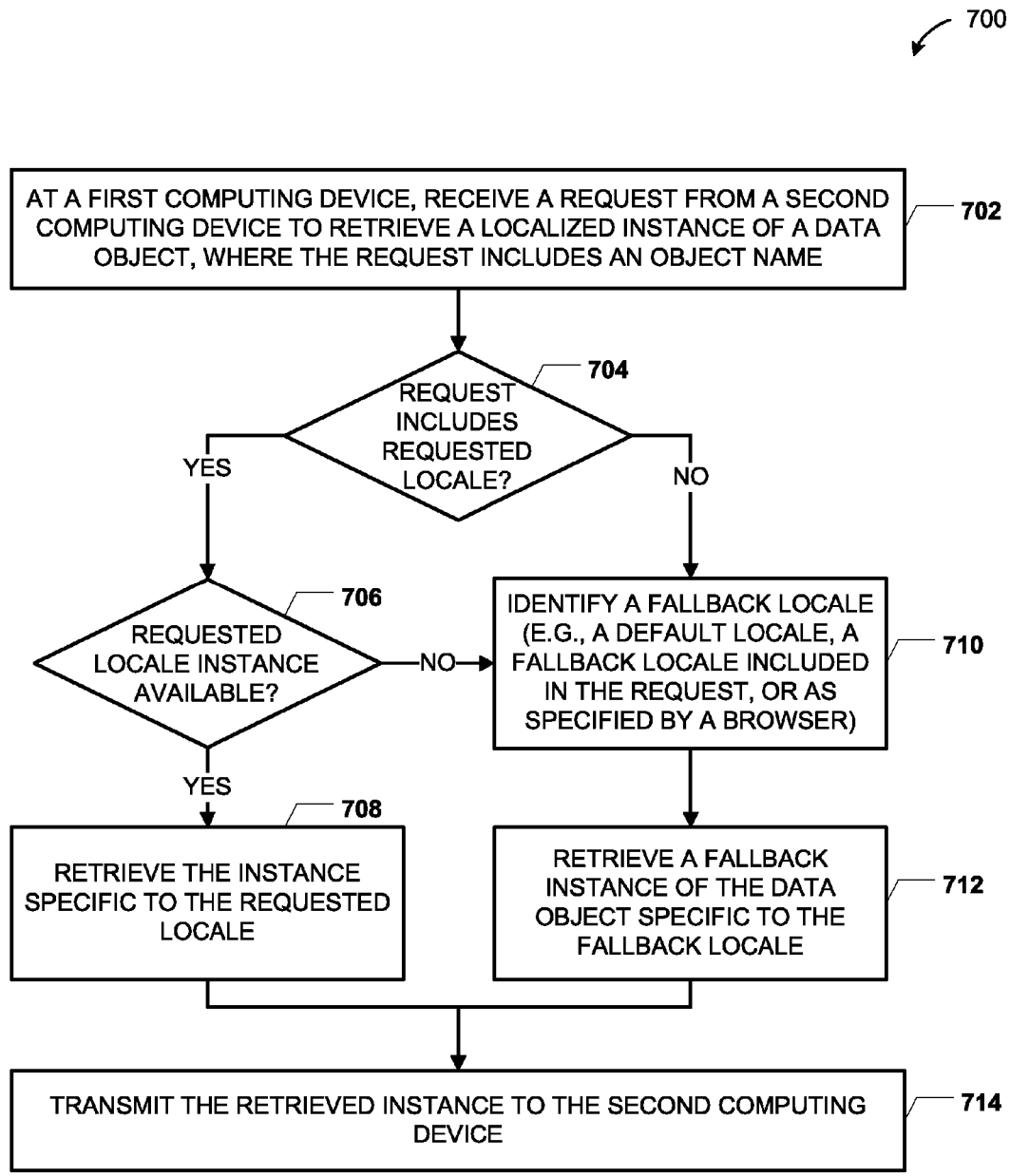
FIG. 7 is a flow diagram to illustrate a particular embodiment of a method of retrieving a localized instance of a data object.

FIG. 7 is a flow diagram to illustrate a particular embodiment of a method 700 of retrieving a localized instance of a data object. In an illustrative embodiment, the method 700 may be performed at the system 100 of FIG. 1.

The method 700 may include, at a first computing device, receiving a request from a second computing device to retrieve a localized instance of a data object, at 702. The request may include an object name. For example, in FIG. 1 the object namespace service 130 (e.g., executing at a server) may receive the request 120 that includes the object name 121 "ADDRESS" from the computing device 110.

The method 700 may also include determining whether the request includes a requested locale, at 704. For example, in FIG. 1, the instance retrieval module 131 may determine whether the request 120 includes the requested locale 122. When the request includes the requested locale, the method 700 may include determining whether a locale instance that is specific to the requested locale is available, at 706. For example, in FIG. 1, the requested locale 122 may be "en-US" and the instance retrieval module 131 may determine that the "en-US" localized instance 151 is available. When the instance specific to the requested locale is available, the method 700 may include retrieving the instance, at 708, and transmitting the retrieved instance to the second computing device, at 714. For example, in FIG. 1, the instance retrieval module 131 may retrieve the "en-US" localized instance 151 and transmit the "en-US" localized instance 151 to the computing device 110 as the localized instance 160.

When the request does not include the requested locale, or when the instance specific to the requested locale is not available, the method 700 may include identifying a fallback locale, at 710. For example, the fallback locale may be a default locale, a fallback locale included in the request, or a locale specified by a browser. To illustrate, in FIG. 1, the request 120 may not include the requested locale 122 or may include a requested locale 122 "en-AU" for which no instance is available at the object store 140. The instance retrieval module 131 may identify a fallback locale (e.g., "fr-CA") by selecting a locale of a browser executing at the computing device 110, a default locale, or a locale from the prioritized list of fallback locales 123 (if provided in the request 120). The method 700 may further include retrieving a fallback instance specific to the fallback locale, at 712, and transmitting the retrieved instance to the second computing device, at 714. For example, in FIG. 1, the instance retrieval module 131 may retrieve the "fr-CA" localized instance 152 and transmit the "fr-CA" localized instance 152 to the computing device 110 as the localized instance 160.

Figure 8:
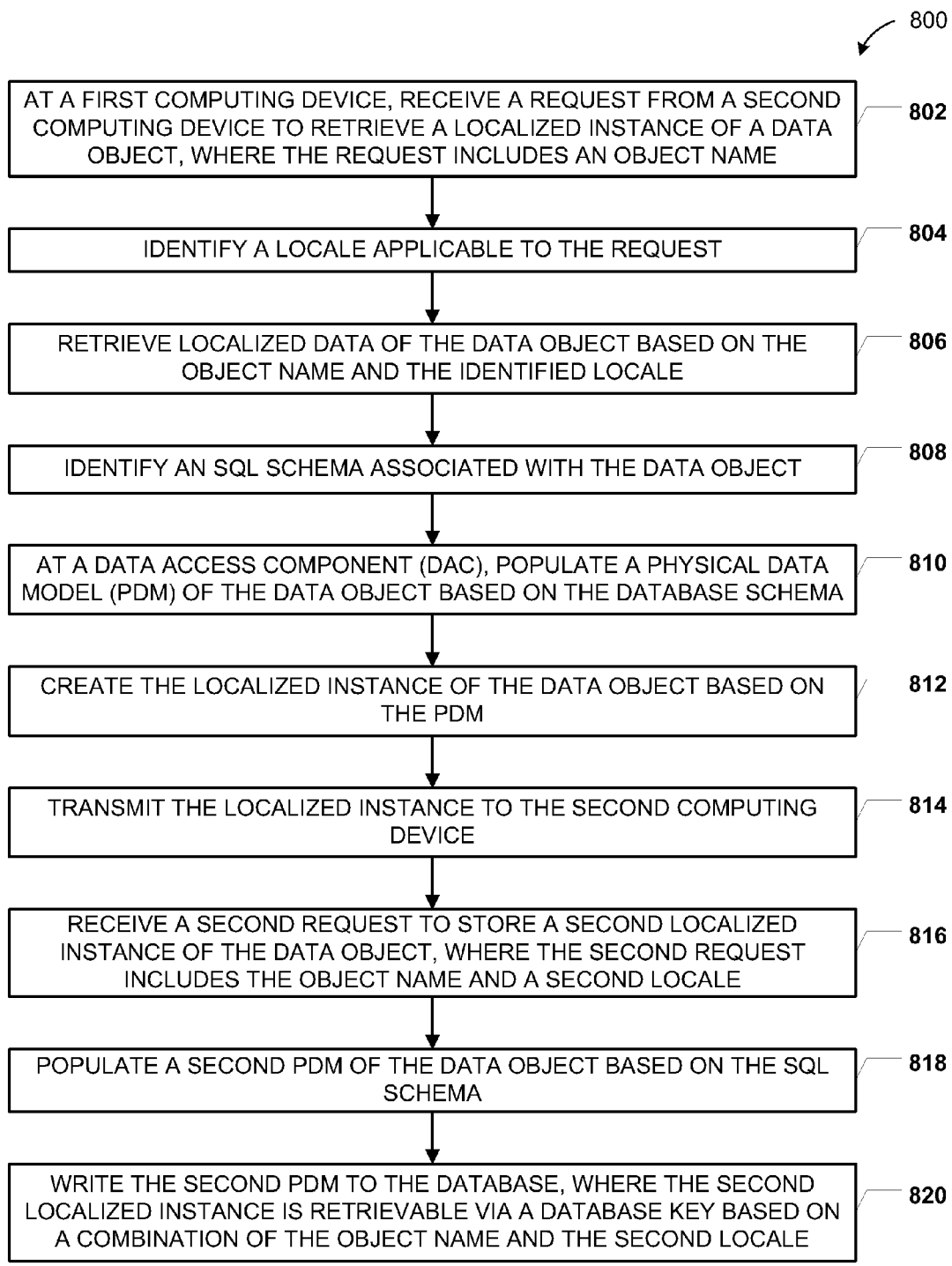
FIG. 8 is a flow diagram to illustrate a particular embodiment of a method of retrieving and storing localized instances of data objects.

FIG. 8 is a flow diagram to illustrate a particular embodiment of a method 800800 of retrieving and storing localized instances of data objects. In an illustrative embodiment, the method 800800 may be performed at the system 100 of FIG. 1 and may be illustrated with reference to FIG. 6.

The method 800 may include, at a first computing device, receiving a request from a second computing device to retrieve a localized instance of a data object, at 802. The request may include an object name. For example, in FIG. 1, the object namespace service 130 may receive the request 120 from the computing device 110, where the request 120 includes the object name 121 "ADDRESS."

The method 800 may also include identifying a locale that is applicable to the request, at 804, and retrieving localized data of the data object based on the object name and the identified locale, at 806. For example, in FIG. 1, the request 120 may include the requested locale 122 "en-US" and the instance retrieval module 131 may retrieve localized data of the "en-US" localized instance 151 from the object sore 140.

In an illustrative embodiment, the "en-US" localized instance 151 is stored at the object store 140 as illustrated by the database record 630 of FIG. 6.

The method 800 may further include identifying an SQL schema associated with the data object, at 808, and populating a physical data model (PDM) of the data object at a data access component (DAC) based on the database schema, at 810. For example, a PDM corresponding to the "en-US" localized instance 151 of FIG. 1 may be populated as illustrated by the in-memory representation 620 of FIG. 6.

In the embodiment illustrated in FIG. 7, the method 800 may include creating the localized instance of the data object based on the PDM, at 812, and transmitting the localized instance to the second computing device, at 814. For example, the localized instance 160 of FIG. 1 may be created as illustrated by the .NET object 610 of FIG. 6 and may be transmitted to the computing device 110.

The method 800 may also include receiving a second request to store a second localized instance of the data object, at 816. The second request may include the object name and a second locale. For example, in FIG. 1, the object namespace service 130 may receive another request 120 from the computing device 110, where the request 120 includes the object name 121 "ADDRESS" and the requested locale 122 "fr-FR." The request 120 may also include the localized instance 124 to be stored.

The method 800 may further include populating a second PDM of the data object based on the SQL schema, at 818, and writing the second PDM to the database, at 820. The second localized instance may be retrievable via a database key that is based on a combination of the object name and the second locale. For example, the localized instance 124 to be stored may be used to populate another PDM based on the database schema, as illustrated with reference to the in-memory representation 620 of FIG. 6. It should be noted that the database schema for the PDMs may be the same, since both PDMs are associated with localized instances of the same data object (i.e., the "ADDRESS" data object 150 of FIG. 1). The PDM may be written to the database as illustrated by the database record 630 of FIG. 6. The stored localized instance may be retrievable via a key that is based on a combination of the object name 121 "ADDRESS" and the requested locale 122 "fr-FR." For example, the key may be "ADDRESS fr-FR."

Figure 9:
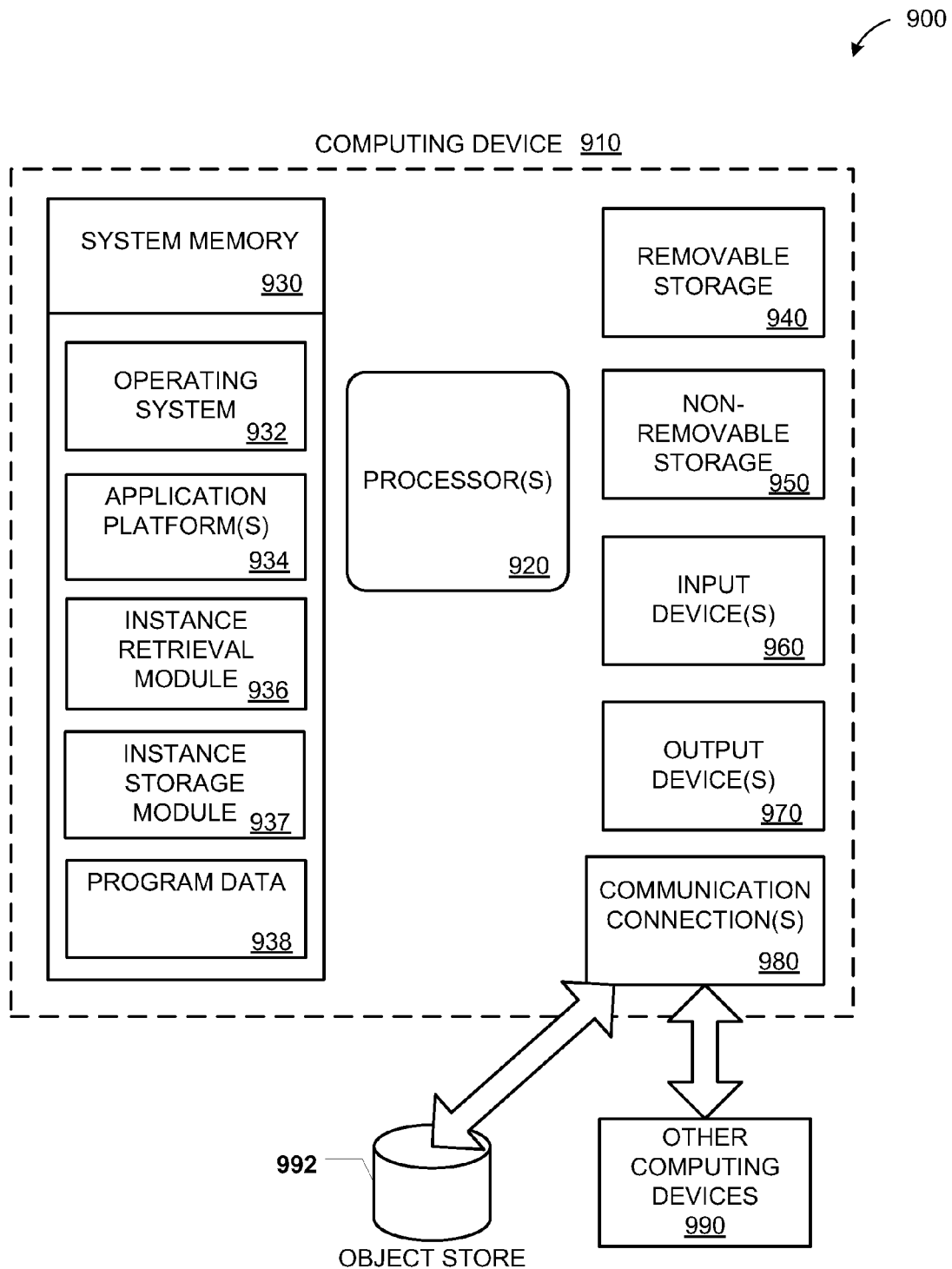
FIG. 9 is a block diagram of a computing environment including a computing device operable to support embodiments of computer-implemented methods, computer program products, and system components as illustrated in FIGS. 1-8.

FIG. 9 shows a block diagram of a computing environment 800 including a computing device 910 operable to support embodiments of computer-implemented methods, computer program products, and system components according to the present disclosure. For example, the computing device 910 or components thereof may include, implement, or be included as a component of the computing device 110 of FIG. 1, the object namespace service 130 of FIG. 1, the object store 140 of FIG. 1, or portions thereof.

The computing device 910 includes at least one processor 920 and a system memory 930. For example, the computing device 910 may be a desktop computer, a laptop computer, a tablet computer, a mobile phone, a server, or any other fixed or mobile computing device. Depending on the configuration and type of computing device, the system memory 930 may be volatile (such as random access memory or "RAM"), non-volatile (such as read-only memory or "ROM," flash memory, and similar memory devices that maintain stored data even when power is not provided), non-transitory, some combination of the three, or some other memory. The system memory 930 may include an operating system 932, one or more application platforms 934, one or more applications, and program data 938. In the embodiment illustrated, the system memory 930 includes an instance retrieval module 936 and an instance storage module 937. In an illustrative embodiment, the instance retrieval module 936 is the instance retrieval module 131 of FIG. 1, and the instance storage module 937 is the instance storage module 132 of FIG. 1.

The computing device 910 may also have additional features or functionality. For example, the computing device 910 may also include removable and/or non-removable additional data storage devices such as magnetic disks, optical disks, tape, and standard-sized or flash memory cards. Such additional storage is illustrated in FIG. 9 by removable storage 940 and non-removable storage 950. Computer storage media may include volatile and/or non-volatile storage and removable and/or non-removable media implemented in any technology for storage of information such as computer-readable instructions, data structures, program components or other data. The system memory 930, the removable storage 940, and the non-removable storage 950 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 910. Any such computer storage media may be part of the computing device 910.

The computing device 910 may also have input device(s) 960, such as a keyboard, mouse, pen, voice input device, touch input device, etc. connected via one or more input interfaces. Output device(s) 970, such as a display, speakers, printer, etc. may also be included and connected via one or more output interfaces.

The computing device 910 also contains one or more communication connections 980 that allow the computing device 910 to communicate with other computing devices 990 over a wired or a wireless network. In an illustrative embodiment, the other computing devices 990 include the computing device 110 of FIG. 1. The one or more communication connections 980 may also enable the computing device 910 to communicate with an object store 992. In an illustrative embodiment, the object store 992 is the object store 140 of FIG. 1. For example, the one or more communication connections 980 may represent an interface that communicates with the other computing devices 990 and with the object store 992 via a network. The interface may be configured to receive requests to retrieve or store localized instances of data objects from the other computing devices 990. The interface may also be configured to transmit localized instances of data objects to the other computing devices 990.

It will be appreciated that not all of the components or devices illustrated in FIG. 9 or otherwise described in the previous paragraphs are necessary to support embodiments as herein described. For example, the removable storage 940 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
   at a first computing device, receiving a request from a second computing device to retrieve a localized instance of a data object, wherein the request includes an object name and a requested locale;
   determining whether the localized instance of the data object that is specific to the requested locale is available;
   when the localized instance is available, retrieving the localized instance and transmitting the retrieved localized instance to the second computing device, wherein the localized instance includes a plurality of data elements that are specific to the requested locale; and
   when the localized instance is not available:
   identifying a fallback locale;
   retrieving a fallback instance of the data object that is specific to the identified fallback locale; and
   transmitting the fallback instance of the data object to the second computing device.

2. The computer-implemented method of claim 1, wherein the localized instance is one of a plurality of localized instances of the data object, wherein each of the localized instances is associated with the object name, and wherein each of the localized instances is specific to a different locale.

3. The computer-implemented method of claim 2, further comprising:
   receiving a second request from the second computing device to retrieve a second localized instance of the data object specific to a second locale;
   retrieving a second localized instance of the data object based on the object name and the second locale; and
   transmitting the second localized instance to the second computing device.

4. The computer-implemented method of claim 1, wherein the plurality of data elements includes a string data element, a graphic data element, an audio stream data element, a video stream data element, or any combination thereof.

5. The computer-implemented method of claim 1, wherein at least one of the plurality of data elements is represented in accordance with a country of the requested locale, a language of the requested locale, a character set of the requested locale, a spelling rule of the requested locale, a grammatical rule of the requested locale, a time format of the requested locale, a date format of the locale, a currency of the requested locale, a numeral system of the requested locale, a measurement unit system of the requested locale, or any combination thereof.

6. A computer system, comprising:
   a processor;
   one or more data storage devices to store an object database;
   a communication interface configured to:
      receive, from a computing device, a localized instance request of a data object from the object database, wherein the localized instance request includes an object name, a requested locale, and one or more fallback locales;
   a retrieval module executable by the processor to:
      determine whether an instance of the data object that is specific to the requested locale is available at the object database;
      when the instance is available:
      retrieve first localized data of the data object from the object database based on the object name and the requested locale; and
      create a localized instance of the data object based on the first localized data; and
      when the instance is not available:
      retrieve second localized data of the data object from the object database based on the object name and the one or more fallback locales; and
      create a localized instance of the data object based on the second localized data; and
   a communication interface configured to:
      transmit the localized instance of the data object to the computing device.

7. The computer system of claim 6, further comprising a storage module executable by the processor to store localized instances of data objects to the object database, wherein each particular localized instance of a particular data object is uniquely identifiable via a combination of an object name of the particular data object and a target locale of the particular localized instance.

8. A computer-readable storage device embedded with instructions that are executable by at least one processor to perform a method comprising:
- receiving, at a first computing device, a request from a second computing device to retrieve a localized instance of a data object, wherein the request includes an object name and a requested locale;
- determining whether the localized instance of the data object that is specific to the requested locale is available;
- when the localized instance is available, retrieving the localized instance and transmitting the retrieved localized instance to the second computing device, wherein the localized instance includes a plurality of data elements that are specific to the requested locale; and
- when the localized instance is not available:
- identifying a fallback locale;
- retrieving a fallback instance of the data object that is specific to the identified fallback locale; and
- transmitting the fallback instance of the data object to the second computing device.

9. The computer-implemented method of claim 8, wherein the request is transmitted by a browser at the second computing device and wherein identifying the fallback locale comprises identifying a locale of the browser.

10. The computer-implemented method of claim 8, wherein the fallback locale is included in the request.

11. The computer-implemented method of claim 8, wherein the request includes a prioritized list of fallback locales.

12. The computer-implemented method of claim 8, wherein retrieving the localized instance of the data object comprises:
- retrieving localized data of the data object from a database;
- identifying a database schema associated with the data object;
- populating an in-memory representation of the data object based on the identified database schema; and
- creating the localized instance of the data object based on the in-memory representation.

13. The computer-implemented method of claim 12, wherein the identified database schema comprises a structured query language (SQL) schema, wherein the in-memory representation comprises a physical data model (PDM), and wherein the in-memory representation is populated by a data access component (DAC).

14. The computer-implemented method of claim 12, further comprising:
- receiving a second request from the second computing device to store a second localized instance of the data object, wherein the second request includes the object name and a second locale;
- populating a second in-memory representation of the data object based on the identified database schema; and
- writing the second in-memory representation to the database,
- wherein the second localized instance of the data object is retrievable from the database via a combination of the object name and the second locale.

* * * * *